US008713597B2

(12) United States Patent
Sun et al.

(10) Patent No.: US 8,713,597 B2
(45) Date of Patent: Apr. 29, 2014

(54) AUTHENTICATING AND OFF-LOADING IPTV OPERATIONS FROM MOBILE DEVICES TO FIXED RENDERING VIEWING DEVICES

(75) Inventors: Yong Sun, Ottawa (CA); Vinod K. Choyi, Ottawa (CA)

(73) Assignee: Alcatel Lucent, Paris (FR)

( * ) Notice: Subject to any disclaimer, the term of this patent is extended or adjusted under 35 U.S.C. 154(b) by 448 days.

(21) Appl. No.: 12/652,615

(22) Filed: Jan. 5, 2010

(65) Prior Publication Data
US 2011/0167444 A1 Jul. 7, 2011

(51) Int. Cl.
H04N 7/167 (2011.01)
H04N 7/173 (2011.01)
G06F 7/04 (2006.01)
H04L 9/08 (2006.01)
H04H 20/71 (2008.01)

(52) U.S. Cl.
USPC ............... 725/31; 725/93; 725/109; 380/283; 726/29; 455/3.03

(58) Field of Classification Search
USPC ........... 725/62, 109, 80, 81, 31, 93; 455/3.03; 380/283; 726/29
See application file for complete search history.

(56) References Cited

U.S. PATENT DOCUMENTS

| | | | |
|---|---|---|---|
| 6,157,935 A * | 12/2000 | Tran et al. ...................... 715/202 |
| 6,226,618 B1 * | 5/2001 | Downs et al. ................... 705/51 |
| 6,532,495 B1 * | 3/2003 | Welles et al. .................. 709/232 |
| 6,628,963 B1 * | 9/2003 | Chung ................................ 1/1 |
| 7,344,084 B2 * | 3/2008 | DaCosta .................... 235/472.01 |
| 7,627,341 B2 * | 12/2009 | Wu .............................. 455/556.1 |
| 7,688,754 B2 * | 3/2010 | Williams ....................... 370/253 |
| 8,316,154 B2 * | 11/2012 | Yoneda ......................... 709/248 |
| 2003/0018917 A1 * | 1/2003 | Brown, Sr. .................... 713/201 |
| 2004/0054689 A1 * | 3/2004 | Salmonsen et al. ........ 707/104.1 |
| 2006/0005253 A1 * | 1/2006 | Goldshlag et al. ............. 726/26 |
| 2006/0190559 A1 * | 8/2006 | Lim ............................... 709/217 |
| 2007/0067808 A1 * | 3/2007 | DaCosta ......................... 725/62 |
| 2007/0220163 A1 * | 9/2007 | Khouderchah et al. ....... 709/231 |
| 2007/0288970 A1 * | 12/2007 | Tedenvall ....................... 725/86 |
| 2008/0196072 A1 * | 8/2008 | Chun ............................. 725/105 |
| 2008/0305738 A1 * | 12/2008 | Khedouri et al. ............. 455/3.06 |
| 2009/0019492 A1 * | 1/2009 | Grasset ............................ 725/45 |
| 2009/0031375 A1 * | 1/2009 | Sullivan et al. ................ 725/105 |
| 2010/0154023 A1 * | 6/2010 | Dey ............................... 725/151 |
| 2010/0265827 A1 * | 10/2010 | Horn et al. .................... 370/241 |
| 2011/0058675 A1 * | 3/2011 | Brueck et al. ................. 380/277 |
| 2012/0246480 A1 * | 9/2012 | Selander et al. .............. 713/168 |

FOREIGN PATENT DOCUMENTS

| | | | | |
|---|---|---|---|---|
| EP | 1939781 A1 | * | 7/2008 |
| EP | 1940111 A2 | * | 7/2008 |
| EP | 2194691 A1 | * | 6/2010 |

* cited by examiner

*Primary Examiner* — James R Sheleheda
(74) *Attorney, Agent, or Firm* — Garlick & Markison; Holly L. Rudnick

(57) ABSTRACT

A mobile IPTV system enables authenticating and off-loading of IPTV operations from a mobile device to an external fixed viewing device. The mobile device performs authentication to an IPTV network to receive decryption key(s) for use in decrypting IPTV content and provides the decryption key to the viewing device. The viewing device uses the decryption key to decrypt and render IPTV content thereon.

20 Claims, 4 Drawing Sheets

AUTHENTICATING AND OFF-LOADING IPTV OPERATIONS FROM MOBILE DEVICES TO FIXED RENDERING VIEWING DEVICES

BACKGROUND OF THE INVENTION

1. Technical Field of the Invention

The present invention relates in general to IP television (IPTV) systems, and in particular, to rendering of IPTV content on viewing devices.

2. Description of Related Art

With today's widespread use of the Internet as a communication medium, packet-switched networks, such as Internet Protocol (IP), Multiprotocol Label Switching (MPLS), Asynchronous Transfer Mode (ATM) and Ethernet networks, are increasingly being used to transmit digital multimedia data or content (e.g., audio, full-motion audio/video, pictures, etc.). An example of an architecture that uses packet-switched networks to provide real-time (live or video-on-demand) multimedia content to end users is the IP television (IPTV) architecture. Within the IPTV architecture, head end servers obtain media content, such as digital broadcast television programs, and stream the media content over a packet-switched network to one or more set top boxes (STBs) associated with television viewers who have subscribed to receive the television program.

IPTV has recently been deployed in the mobile market to enable mobile users to receive and view IPTV programs on their mobile devices. To implement a mobile TV solution, IPTV content, such as digital broadcast television programs, are streamed over a packet-switched network to a mobile access network, such as a Global System for Mobile Communications (GSM) network, Universal Mobile Telecommunications System (UMTS) network, WiMax network, Code Division Multiple Access (CDMA) network or other similar network. The mobile access network then delivers the IPTV content to mobile devices over the air interface.

However, the quality of the IPTV content in terms of resolution and contrast is dictated by the display size of the viewing device. As such, the small screen size of mobile devices negatively impacts the mobile user viewing experience. In addition, the restricted computing capability and finite battery life of mobile devices further limits the viewing experience. For example, as the quality of the IPTV content increases, the drain on the battery, computing power and memory also increases. Therefore, mobile IPTV providers typically stream reduced-quality IPTV content in order to accommodate the small screen size and reduced computing capabilities of mobile devices. Unfortunately, there is no existing IPTV solution that enables a user to enjoy IPTV services anywhere and at anytime with the same or similar experience enjoyed at home.

SUMMARY OF THE INVENTION

Embodiments of the present invention provide a mobile IPTV system for authenticating and off-loading IPTV operations from a mobile device to an external, fixed viewing device. The mobile device establishes a connection to an IPTV network via a mobile access network to authenticate the mobile device to the IPTV network and receive a decryption key for use in decrypting IPTV content. The mobile device provides the decryption key to the viewing device, which then uses the decryption key to decrypt IPTV content received from the IPTV network for rendering of the decrypted IPTV content thereon.

In one embodiment, the mobile device further receives from the viewing device display information indicating display capabilities of the viewing device. The mobile device can then provide the display information to the IPTV network with a request for the IPTV content, receive the IPTV content formatted in accordance with the display information from the IPTV network and provide the received IPTV content to the viewing device. In another embodiment, the viewing device can establish a connection with the IPTV network to receive the IPTV content directly from the IPTV network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
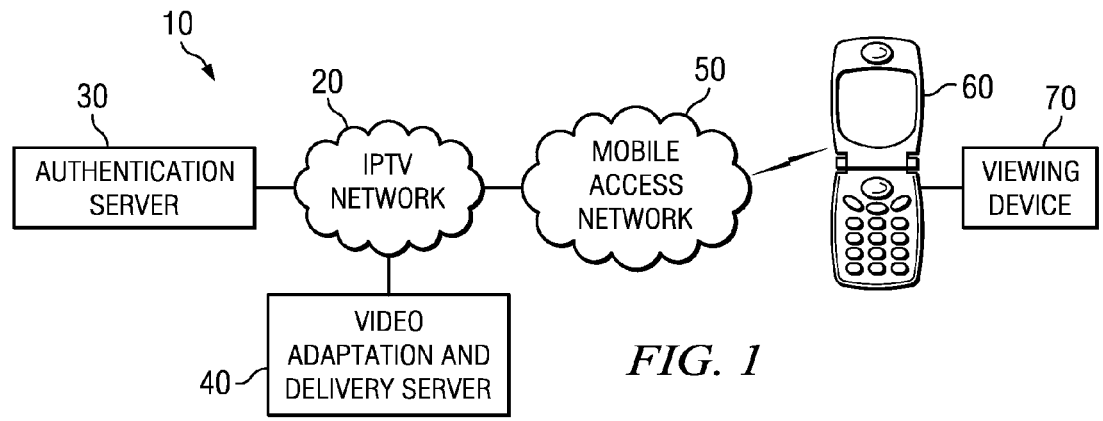
FIG. 1 illustrates an exemplary mobile IPTV system for off-loading IPTV operations from a mobile device to an external viewing device, in accordance with embodiments of the present invention.

Referring to FIG. 1, there is illustrated an exemplary mobile Internet Protocol Television (IPTV) system 10 capable of implementing various embodiments of the present invention. The mobile IPTV system 10 includes an IPTV network 20, a mobile device 60 and a mobile access network 50. The IPTV network 20 is a packet-switched network. For example, the packet-switched network may include, but is not limited to, one or more of an Internet Protocol (IP), Multiprotocol Label Switching (MPLS), Asynchronous Transfer Mode (ATM) or Ethernet network. The mobile device 60 may be, for example, a cell phone, personal digital assistant (PDA), laptop computer or any other similar device. The mobile access network 50 includes any network capable of providing wireless connectivity to the mobile device 60. By way of example, but not limitation, the mobile access network 50 can include one or more of a GSM network, a CDMA network, a UMTS network, a WiMax network, a LTE network or any other similar network.

The IPTV network 20 includes an Authentication Server (AS) 30 and a Video Adaptation and Delivery Server (VADS) 40. The AS 30 operates to authenticate the mobile device 60 to the IPTV network 20 and to provide decryption key(s), such as Digital Rights Management (DRM) keys, to enable viewing of purchased IPTV media content. The VADS 40 operates to stream digital audio/video content containing live national and/or local television programs and/or video-on-demand (VoD) programs to the mobile device 60. For example, the VADS 40 can receive national television programs associated with one or more broadcasting stations and operate to stream the national television programs to the mobile device 60 via the IPTV network 20 and mobile access network 50. In addition, the VADS 40 streams local television programs and VoD programs to the mobile device 60 via the IPTV network 20 and mobile access network 50.

In addition, in accordance with embodiments of the present invention, the mobile IPTV system 10 also includes a viewing device 70. The viewing device 70 is coupled to the mobile device 60 via WiFi, Bluetooth, Ethernet or any other physical or wireless connection to enable off-loading of IPTV operations, such as decryption, decompression, de-coding and rendering (play back) of IPTV content, from the mobile device 60 to the viewing device 70. By off-loading the decryption, de-coding and rendering of IPTV content from the mobile device 60 to the viewing device 70, the mobile user's experience can be greatly enhanced due to the larger screen size (e.g., resolution, contrast, etc.), increased computing capabilities and steady power source of the viewing device 70.

In an exemplary operation, the mobile device 60 performs authentication of the mobile user to the AS 30 by, for example, transmitting authentication information stored within the mobile device 60 to the AS 30. Upon authentication, the AS 30 transmits decryption key(s) to the mobile device 60 for use in decrypting IPTV content subsequently transmitted from the IPTV network 20. The mobile device 60 forwards the decryption key(s) to the viewing device 70 so that the viewing device can join the IPTV network 20 to receive, decrypt, de-code and render IPTV content thereon.

For example, in one embodiment, the mobile device 60 requests and receives display information containing the display capabilities (i.e., maximum resolution/aspect ratio, screen size, display mode (NTSC or PAL), color depth, bit depth, etc.) from the viewing device 70 and then transmits a request for IPTV content (e.g., a digital broadcast television program or video-on-demand) containing the display information of the viewing device to the VADS 40. The VADS 40 adapts the requested IPTV content based on the display information received and sends encrypted IPTV content (i.e., IP packets) to the mobile device 60. Upon receiving the encrypted IPTV content formatted in accordance with the display capabilities of the viewing device 70, the mobile device 60 forwards the encrypted IPTV content to the viewing device 70 for decryption using the decryption key(s), de-coding and rendering (i.e., output of audio/video on a display/speakers of a display device).

In another embodiment, the viewing device 70 couples to the IPTV network 20 to request and receive IPTV content from the VADS 40 independent of the mobile device 60. In this embodiment, the viewing device 70 has a TCP/IP stack thereon in order to receive the IPTV content. In addition, to enable the viewing device 70 to request and receive the IPTV content, the mobile device 60 transmits an identifier associated with the mobile device 60, along with the decryption key(s), to the viewing device 70 and the viewing device 70 uses the received identifier to access the IPTV network 20. The identifier may be an identity of the mobile device 60 or a temporary identifier assigned to the viewing device 70 by the IPTV network 20 (i.e., the AS 30 or the VADS 40). For example, when authenticating, the mobile device 60 may provide an identity of the viewing device 70 to the AS 30 and the AS 30 may then either temporarily associate the viewing device's identity with the mobile device's identity or assign a temporary identifier to the viewing device 70 to enable the viewing device 70 to request and receive IPTV content as the mobile device 60. As another example, the mobile device 60 may provide the identity of the viewing device 70 to the VADS 40, along with the display information and request for IPTV content, to enable the VADS 40 to establish a connection with the viewing device 70 and transmit the IPTV content directly to the viewing device 70.

Figure 2:
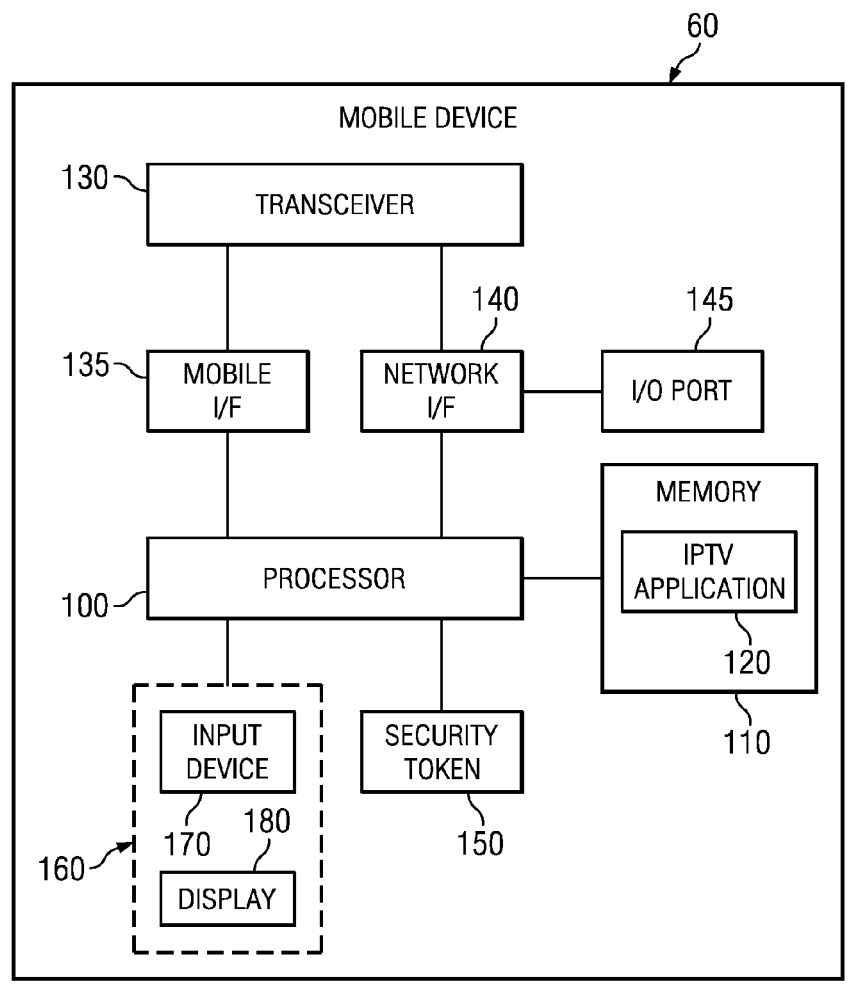
FIG. 2 is a block diagram illustrating an exemplary mobile device, in accordance with embodiments of the present invention.

FIG. 2 is a block diagram illustrating an exemplary mobile device 60, in accordance with embodiments of the present invention. The mobile device 60 includes a processor 100, memory 110, transceiver 130, graphical user interface 160 containing an input device 170 and a display 180, mobile interface 135 and a network interface 140. The mobile interface 135 provides a connection to the mobile access network (shown in FIG. 1) via transceiver 130 to receive IPTV services. The network interface 140 provides a connection to the viewing device (shown in FIG. 1) to off-load IPTV operations to the viewing device.

The network interface 140 may provide a physical (direct wireline) or wireless connection to the viewing device. For example, in one embodiment, the network interface 140 couples to the transceiver 130 to enable a wireless connection, such as WiFi or Bluetooth, to be established between the mobile device 60 and the viewing device. In this embodiment, the transceiver 130 may include two transceivers, one for communicating with the mobile access network and another for communicating with the viewing device, or the transceiver 130 may be a single transceiver capable of operating in different modes to enable communications between the mobile device 60 and both the mobile access network and the viewing device to be established either sequentially or simultaneously. In another embodiment, the network interface 140 couples to an input/output (I/O) port 145 to enable a physical connection, such as an Ethernet connection, to be established between the mobile device 60 and the viewing device.

The memory 110 includes an IPTV application 120, which contains software instructions executable by the processor 100 to provide IPTV services to the mobile device 60 and to off-load IPTV operations to the viewing device. For example, the processor 100 can execute instructions of the IPTV application 120 to authenticate the mobile device 60 to the IPTV network via mobile interface 135 and transceiver 130, using, for example, a security token 150 stored on the mobile device 60. The security token 150 can be a hard token integrated into the mobile device 60 or a soft token stored within memory 110. The security token 150 may contain, for example, a private key of the mobile device used to authenticate to AS. In another embodiment, the mobile user may need to enter a password or PIN via the graphical user interface 160 to begin the authentication process. For example, the processor 100 can execute instructions of the IPTV application 120 to provide a prompt to the mobile user on the display 180 to input the password and then receive the password via the input device 170. The input device 170 can include, for example, a keypad, keyboard, touch screen, stylus or other type of input device 170.

The processor 100 can further execute instructions of the IPTV application 120 to receive decryption key(s) from the IPTV network via mobile interface 135 and to forward the decryption key(s) to the viewing device via network interface 140. For example, the processor 100 can receive the decryption key(s) from mobile interface 135 in a protocol used by the mobile access network and convert the decryption key(s) into a protocol used by the viewing device for transmission to the viewing device via network interface 140.

In further embodiments, the processor 100 may also execute instructions of the IPTV application 120 to transmit a request for display information to the viewing device 70 via network interface 140 and to receive from the viewing device 70 the display information containing the display capabilities of the viewing device 70 via network interface 140. In addition, the processor 100 can execute instructions of the IPTV application 120 to transmit a request for IPTV content containing the display information of the viewing device to the VADS of the IPTV network via mobile interface 135 and transceiver 130, receive the requested IPTV content from the VADS via transceiver 130 and mobile interface 135 and retransmit the received IPTV content to the viewing device via network interface 140.

In still further embodiments, the processor 100 may also execute instructions of the IPTV application 120 to transmit a request for the viewing device identity to the viewing device via network interface 140 and receive the viewing device identity from the viewing device via network interface 140. The processor 100 can then transmit the viewing device identity to the IPTV network via mobile interface 135 to cause the IPTV network to assign a temporary identifier to the viewing device that will enable the viewing device to directly access the IPTV network as the mobile device. In another embodiment, the processor 100 can further execute instructions of the IPTV application 120 to transmit the identity of the mobile device 60 to the viewing device via network interface 140 to enable the viewing device to access the IPTV network as the mobile device.

The processor 100 can include a host processor for executing operations of the host mobile device 60, including the IPTV application 120, and a baseband processor for processing data transmitted and/or received to/from the mobile access network and/or viewing device. For example, the baseband processor can perform modulation/demodulation, encoding/decoding, constellation mapping/demapping, digital intermediate frequency to baseband conversion and other types of transceiver data processing. In other embodiments, the baseband processor operations can be included in the transceiver 130.

As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein. In addition, as used herein, the term "memory" includes any type of data storage device, including but not limited to, a hard drive, random access memory (RAM), read only memory (ROM), flash memory, compact disc, floppy disc, ZIP® drive, tape drive or other type of storage device or storage medium.

Figure 3:
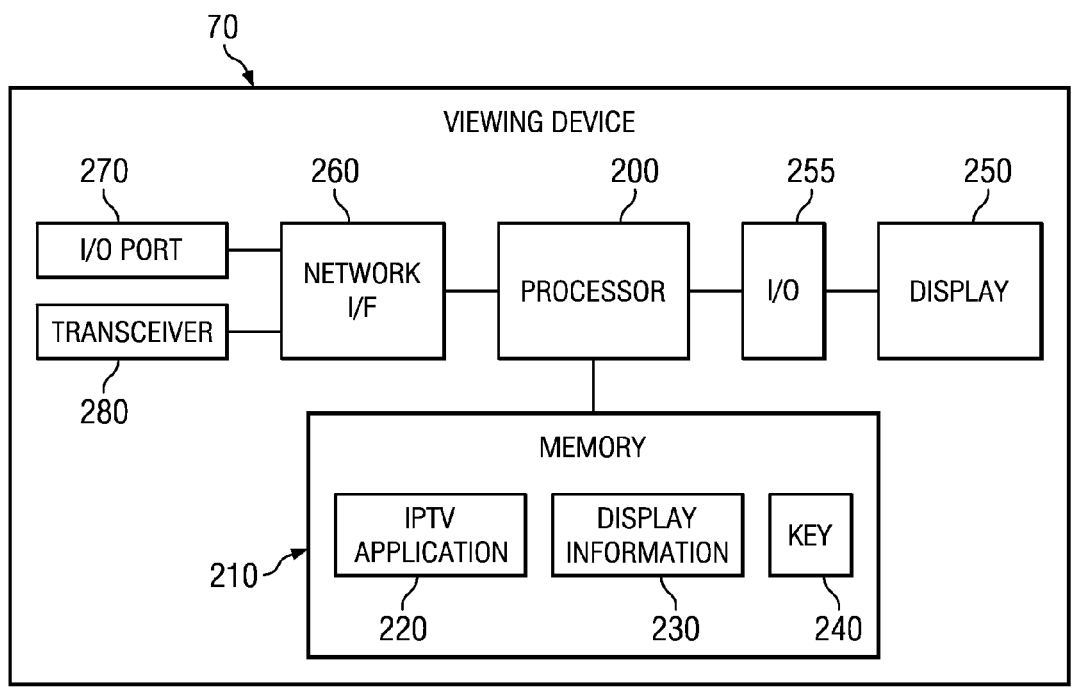
FIGS. 3 and 4 illustrate exemplary viewing devices, in accordance with embodiments of the present invention.

FIG. 3 is a block diagram illustrating an exemplary viewing device 70, in accordance with embodiments of the present invention. The viewing device 70 includes a processor 200, memory 210, network interface 260, I/O ports 255 and 270, transceiver 280 and display device 250. The network interface 260 may provide a physical or wireless connection to the mobile device. For example, in one embodiment, the network interface 260 couples to the transceiver 280 to enable a wireless connection, such as WiFi or Bluetooth, to be established between the mobile device and the viewing device 70. In another embodiment, the network adapter 260 couples to an input/output (I/O) port 270 to enable a physical connection, such as an Ethernet connection, to be established between the mobile device and the viewing device 70.

The memory 210 includes an IPTV application 220, which contains software instructions executable by the processor 200 to enable viewing device 70 to off-load IPTV operations from the mobile device. For example, the processor 200 can execute instructions of the IPTV application 220 to establish a connection with a mobile device via network interface 260, receive decryption key(s) 240 from the mobile device and store the decryption key(s) 240 within the memory 210.

The processor 200 can further execute instructions of the IPTV application 220 to receive a request for display information 230 containing display capabilities, such as resolution, contrast, technology, refresh rates, etc., of the viewing device from the mobile device, access the memory 210 to retrieve the display information 230 for the viewing device 70 and provide the display information 230 to the mobile device via the network interface 260. In addition, the processor 200 can execute instructions of the IPTV application 220 to receive encrypted IPTV content formatted in accordance with the display capabilities of the viewing device from the mobile device via network interface 260, decrypt the received IPTV content using the decryption key(s) 240, de-code the decrypted IPTV content and render the IPTV content on the display device 250 via I/O port 255.

In still further embodiments, the processor 200 may also execute instructions of the IPTV application 220 to receive a request for a viewing device identity from the mobile device and/or receive a temporary identifier assigned to the viewing device from the mobile device via network interface 260 that will enable the viewing device to directly access the IPTV network as the mobile device. For example, the processor 200 can execute instructions of the IPTV application 220 to connect to the IPTV network via an additional network interface (not shown) to request and/or receive IPTV content formatted in accordance with the display capabilities of the viewing device from the VADS within the IPTV network. The processor 200 can then execute instructions of the IPTV application 220 to decrypt the received IPTV content using the stored decryption key(s), de-code the decrypted IPTV content and render the IPTV content on the display device 250.

Figure 4:
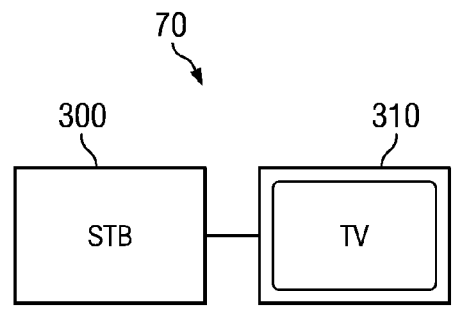

As shown in FIG. 4, the viewing device 70 can include, for example, a set top box 300 and television 310. In one embodiment, the set top box 300 can be external to the television 310 and include the processor 200, memory 210 and other circuitry for connecting to the mobile device and for connecting to the television 310 (i.e., display device 250). In another embodiment, the television 310 can be configured with set top box 300 functionality internal to the television so that all connections to the mobile device and to any external network are made via the television 310.

Figure 5:
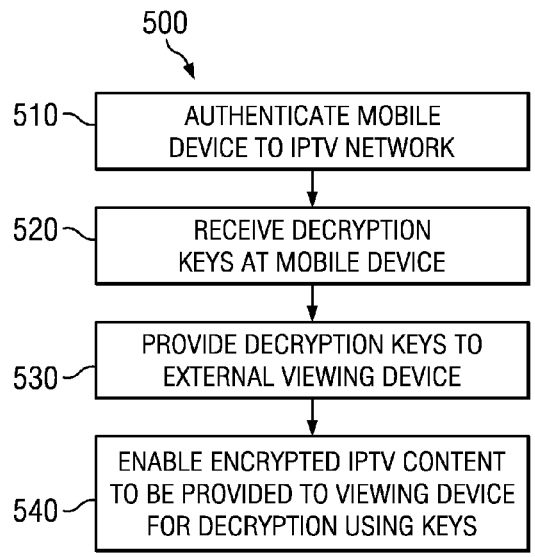
FIG. 5 is a flowchart illustrating an exemplary process for authenticating and off-loading IPTV operations from a mobile device to an external viewing device, in accordance with embodiments of the present invention.

FIG. 5 is a flowchart illustrating an exemplary process 500 for authenticating and off-loading IPTV operations from a mobile device to an external viewing device, in accordance with embodiments of the present invention. The method begins at block 510, where the mobile device transmits authentication information to the IPTV network to authenticate the mobile device to the IPTV network. Upon a successful authentication, at block 520, the mobile device receives the decryption key(s) from the IPTV network, and at block 530, provides the decryption key(s) to the viewing device. At block 540, the mobile device enables encrypted IPTV content to be provided to the viewing device for decryption using the decryption key(s) and rendering on the viewing device.

Figure 6:
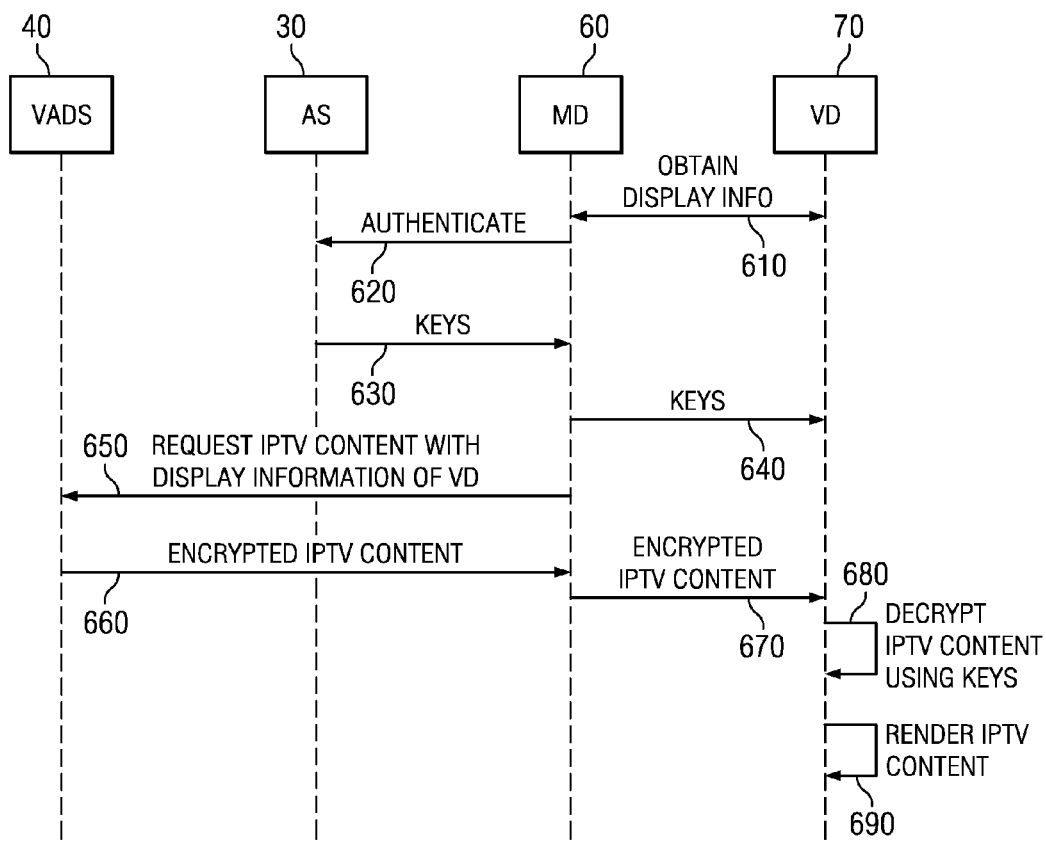
FIGS. 6 and 7 are flow diagrams illustrating exemplary off-loading of IPTV operations from a mobile device to an external viewing device, in accordance with embodiments of the present invention.
Figure 7:
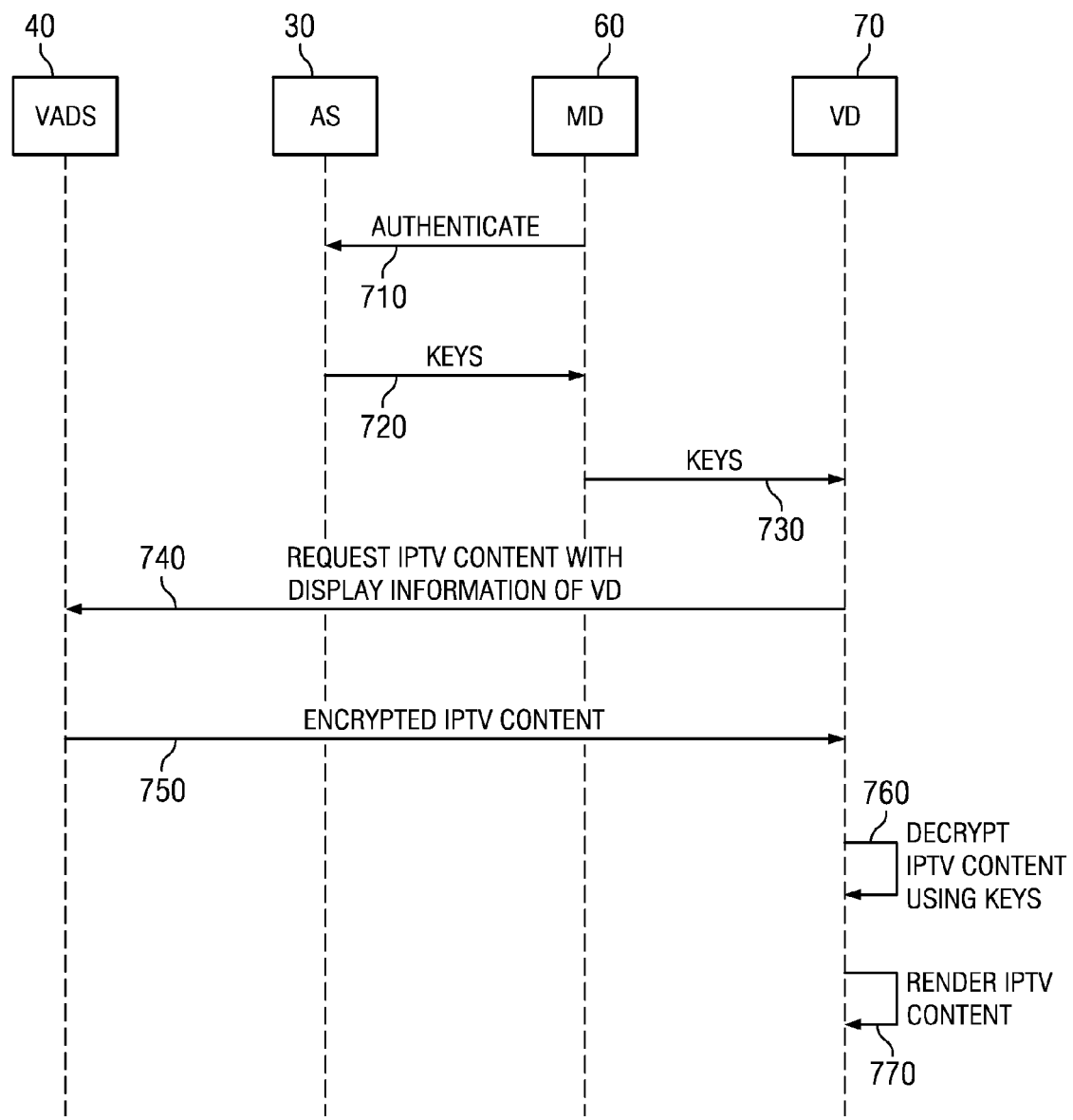

FIGS. 6 and 7 are flow diagrams illustrating exemplary provisioning of content between operators, in accordance with embodiments of the present invention. Turning first to FIG. 6, at 610, the mobile device 60 connects to the viewing device via a wireline or wireless connection and obtains display information from the viewing device 70 indicating the display capabilities (i.e., resolution, contrast, refresh rate, etc.) of the viewing device. At 620, the mobile device 60 authenticates itself to the Authentication Server (AS) 30 within the IPTV network using, for example, a security token and/or other authentication information. Upon a successful authentication, at 630, the AS 30 transmits the decryption key(s), i.e., DRM keys, to the mobile device 60, and at 640, the mobile device 60 forwards the decryption key(s) to the viewing device 70.

Thereafter, at 650, the mobile device 60 transmits a request for IPTV content (e.g., a particular digital broadcast television program or a video-on-demand program) with the display information of the viewing device 70 to the Video and Adaptation Server (VADS) 40 within the IPTV network. The VADS 40 uses the display information to adapt the IPTV content to the particular display characteristics of the viewing device 70 and, at 660, transmits adapted and encrypted IPTV content to the mobile device 60. The mobile device 60, in turn, at 670, forwards the adapted and encrypted IPTV content to the viewing device 70. The viewing device 70, at 680, then decrypts the IPTV content using the decryption key(s) provided by the mobile device 60, and at 690, renders (plays back) the IPTV content thereon.

In another embodiment, as shown in FIG. 7, at 710, the mobile device authenticates itself to the AS 30 within the IPTV network using, for example, a security token and/or other authentication information. Upon a successful authentication, at 720, the AS 30 transmits the decryption key(s), i.e., DRM keys, to the mobile device 60, and at 730, the mobile device 60 forwards the decryption key(s) to the viewing device 70.

Thereafter, at 740, the viewing device 70 transmits a request for IPTV content (e.g., a particular digital broadcast television program or a video-on-demand program) via another network connection (i.e., through a wireline Internet connection) with the display information of the viewing device 70 to the Video and Adaptation Server (VADS) 40 within the IPTV network. The VADS 40 uses the display information to adapt the IPTV content to the particular display characteristics of the viewing device 70 and, at 750, transmits adapted and encrypted IPTV content to the viewing device 70. At 760, the viewing device 70 decrypts the IPTV content using the decryption key(s) provided by the mobile device 60, and at 770, renders (plays back) the IPTV content thereon.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A mobile device comprising:
 a mobile interface operable to establish a connection to an Internet Protocol Television (IPTV) network via a mobile access network;
 a network interface operable to establish a connection to an external fixed viewing device; and
 a processor coupled to the mobile interface and the network interface and operable to authenticate the mobile device to the IPTV network and receive a decryption key for decrypting IPTV content via the mobile interface, the processor being further operable to provide the decryption key and an identifier associated with the mobile device to the viewing device via the network interface, the viewing device using the identifier to emulate the mobile device in order to access the IPTV network independent of the mobile device and request and receive the IPTV content as the mobile device, the viewing device further using the decryption key to decrypt and render the IPTV content thereon.

2. The mobile device of claim 1, further comprising:
 a transceiver coupled to the mobile interface to transmit and receive data to and from the mobile access network.

3. The mobile device of claim 2, wherein the transceiver is further coupled to the network interface to transmit and receive data to and from the viewing device.

4. The mobile device of claim 1, further comprising:
 a network port coupled to the network interface to provide a physical connection to the viewing device.

5. The mobile device of claim 1, further comprising:
 a security token containing authentication information for use in authenticating the mobile device, wherein the processor is further operable to transmit the authentication information to the IPTV network to authenticate the mobile device.

6. The mobile device of Clam 5, further comprising:
 a memory maintaining the security token and coupled to the processor.

7. The mobile device of claim 1, wherein the identifier includes an identity of the mobile device.

8. The mobile device of claim 1, wherein the identifier includes a temporary identifier associated with the mobile device and assigned to the fixed viewing device by the IPTV network.

9. A fixed viewing device for rendering IPTV content, comprising:
 a display device;
 a first network interface operable to establish a connection to a mobile device;
 a second network interface operable to establish a connection to an IPTV network; and
 a processor coupled to the display device and the first and second network interfaces and operable to receive from the mobile device, via the first network interface, a decryption key and an identifier associated with the mobile device, the processor being further operable to use the identifier to emulate the mobile device in order to access the IPTV network independent of the mobile device via the second network interface and request and receive IPTV content from the IPTV network as the mobile device via the second network interface, the processor further operable to decrypt the received IPTV content using the decryption key for rendering of decrypted IPTV content on the display device.

10. The viewing device of claim 9, wherein the display device includes a television and the processor and the first and second network interfaces are included within a set top box coupled to the television.

11. The viewing device of claim 9, further comprising:
 a transceiver coupled to the first network interface to wirelessly transmit and receive data to and from the mobile device.

12. The fixed viewing device of claim 9, wherein the identifier includes an identity of the mobile device.

13. The fixed viewing device of claim 9, wherein the identifier includes a temporary identifier associated with the mobile device and assigned to the fixed viewing device by the IPTV network.

14. A mobile IPTV system for authenticating and offloading mobile IPTV operations, the mobile IPTV system comprising:
 a mobile device operable to establish a connection to an IPTV network via a mobile access network to authenticate the mobile device to the IPTV network to receive a decryption key for use in decrypting IPTV content; and
 a fixed viewing device external to the mobile device and operable to establish a connection to the mobile device to receive the decryption key and an identifier associated with the mobile device, the viewing device further operable to use the identifier to emulate the mobile device in order to access the IPTV network independent of the mobile device and request and receive the IPTV content from the IPTV network as the mobile device, the viewing device further operable to decrypt the received IPTV content using the decryption key for rendering of the decrypted IPTV content thereon.

15. The mobile IPTV system of claim 14, wherein the mobile device includes a security token containing authentication information for use in authenticating the mobile device to the IPTV network.

16. The mobile IPTV system of claim 14, wherein the identifier includes an identity of the mobile device.

17. The mobile IPTV system of claim 14, wherein the identifier includes a temporary identifier associated with the mobile device and assigned to the fixed viewing device by the IPTV network.

18. A method for authenticating and off-loading mobile IPTV operations, comprising:
   authenticating a mobile device to an IPTV network;
   receiving a decryption key at the mobile device from the IPTV network; and
   providing the decryption key and an identifier associated with the mobile device from the mobile device to an external fixed viewing device to enable the viewing device to use the identifier to emulate the mobile device in order to access the IPTV network independent of the mobile device and request and receive IPTV content from the IPTV network as the mobile device, the viewing device further using the decryption key to decrypt the IPTV content and render the IPTV content thereon.

19. The method of claim 18, wherein the identifier includes an identity of the mobile device.

20. The method of claim 18, wherein the identifier includes a temporary identifier associated with the mobile device and assigned to the fixed viewing device by the IPTV network.

\* \* \* \* \*